(12) United States Patent
Ciobanu et al.

(10) Patent No.: US 11,469,996 B2
(45) Date of Patent: Oct. 11, 2022

(54) SYSTEMS FOR SESSION-BASED ROUTING

(71) Applicant: Adobe Inc., San Jose, CA (US)

(72) Inventors: Cosmin Ciobanu, Bucharest (RO);
Adrian Tanase, Mogosoaia (RO)

(73) Assignee: Adobe Inc., San Jose, CA (US)

( * ) Notice: Subject to any disclaimer, the term of this patent is extended or adjusted under 35 U.S.C. 154(b) by 194 days.

(21) Appl. No.: 17/032,568

(22) Filed: Sep. 25, 2020

(65) Prior Publication Data

US 2022/0103469 A1 Mar. 31, 2022

(51) Int. Cl.
*H04L 45/58* (2022.01)
*H04L 9/06* (2006.01)
*H04L 67/1008* (2022.01)
*H04L 47/19* (2022.01)

(52) U.S. Cl.
CPC ............ *H04L 45/58* (2013.01); *H04L 9/0643* (2013.01); *H04L 47/19* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 2018/0150647 A1* | 5/2018 | Naqvi | H04L 9/321 |
| 2020/0119904 A1* | 4/2020 | Philyaw | H04L 63/105 |
| 2020/0186358 A1* | 6/2020 | Capola | H04L 63/0876 |
| 2020/0213117 A1* | 7/2020 | Resch | H04L 9/3268 |
| 2020/0409688 A1* | 12/2020 | Rouland | H04L 9/3239 |
| 2021/0211271 A1* | 7/2021 | Kuang | H04L 9/3239 |
| 2022/0052921 A1* | 2/2022 | Branton | H04L 9/3247 |

FOREIGN PATENT DOCUMENTS

CN 101346972 A * 1/2009 .......... G06F 11/3447

OTHER PUBLICATIONS

Fowler, Martin et al., "Event Sourcing", martinfowler.com [retrieved Oct. 14, 2020], Retrieved from the Internet <https://martinfowler.com/eaaDev/EventSourcing.html>., Dec. 12, 2005, 21 pages.

Sato, Danilo, "CanaryRelease", martinFowler.com [retrieved Oct. 14, 2020], Retrieved from the Internet <https://martinfowler.com/bliki/CanaryRelease.html>., Jun. 25, 2014, 5 pages.

* cited by examiner

*Primary Examiner* — Walter J Divito
(74) *Attorney, Agent, or Firm* — FIG. 1 Patents

(57) ABSTRACT

In implementations of systems for session-based routing, a computing device implements a routing system to receive session data describing a session ID as a character sequence including non-embedded characters and at least one embedded character at a pre-determined index of the character sequence. The routing system extracts the at least one embedded character and determines a processing device configuration corresponding to the at least one embedded character from ledger data describing processing device configurations. The routing system maps the session data to a particular processing device based on the processing device configuration and the non-embedded characters of the character sequence.

20 Claims, 10 Drawing Sheets

400

402
Receive session update data describing a session ID for a session as a character sequence including non-embedded characters and at least one embedded character at a pre-determined index of the character sequence

404
Extract the at least one embedded character from the pre-determined index

406
Determine a previous processing device configuration corresponding to the at least one embedded character from ledger data describing a current processing device configuration and previous processing device configurations

408
Map the session update data to a particular processing device based on the previous processing device configuration and the non-embedded characters of the character sequence

Fig. 4

SYSTEMS FOR SESSION-BASED ROUTING

BACKGROUND

This application claims priority under 35 USC 119 or 365 to Romanian Application No. A/10053/2020, filed Sep. 25, 2020, the disclosure of which is incorporated in its entirety.

A session is a stream of data between a client device and a server system which has a finite duration such as a stream of digital video data, a stream of digital audio data, and so forth. For example, the client device initiates the session by communicating session request data to a load balancing system which manages data flow between backend processing devices available the server system and endpoints such as the client device. Upon receipt of the session request data, the load balancing system routes the session request data to a particular processing device of the backend processing devices and this particular processing device typically communicates reply data back to the load balancing system. This allows the load balancing system to communicate data back to the client device such that the client device receives the stream of data (e.g., the digital video data) but the client device does not have direct access to the particular processing device. Preventing the client device from having direct access to the particular processing device secures the particular processing device from the client device and also facilitates dynamic load balancing.

In dynamic load balancing implementations, the load balancing system takes into account a current state of the backend processing devices and routes the session request data to the particular processing device based on the current state of the backend processing devices. In a first state of the backend processing devices, the particular processing device has excess computational capacity while other processing devices require additional computational capacity. The availability of this computational capacity is dynamic such that in a second state of the backend processing devices, the particular processing device requires additional capacity and the other processing devices have excess computational capacity. By routing the session data based on current states of the backend processing devices in this way, the load balancing system is capable of leveraging multiple different backend processing devices during the session.

In an example, the load balancing system receives session update data from the client device during the session and the load balancing system routes the session update data to a different processing device. The different processing device communicates reply data back to the load balancing system which communicates data directly to the client device. This is possible because the particular processing device and the different processing device are capable of communicating and synchronizing. For example, the different processing device communicates data to the particular processing device and the particular processing device communicates data to the different processing device. Although this communication between the backend processing devices facilitates use of multiple different processing devices as part of the session, these communications and synchronizations also increase network latency, consume computational resources, and so forth.

SUMMARY

Techniques and systems are described for session-based routing. In an example, a computing device implements a routing system to receive session data describing a session ID for a session as a character sequence including non-embedded characters and at least one embedded character at a pre-determined index of the character sequence. In one example, the routing system extracts the at least one embedded character from the pre-determined index.

The routing system determines a processing device configuration corresponding to the at least one embedded character from ledger data describing a current processing device configuration and previous processing device configurations. For example, the routing system identifies a particular processing device based on the previous processing device configuration and the non-embedded characters of the character sequence. The routing system maps the session data to the particular processing device in this example.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 is a flow diagram depicting a procedure in an example implementation in which session update data is received describing a session ID and the session update data is mapped to a particular processing device based on the session ID.

DETAILED DESCRIPTION

Overview

Figure 1:
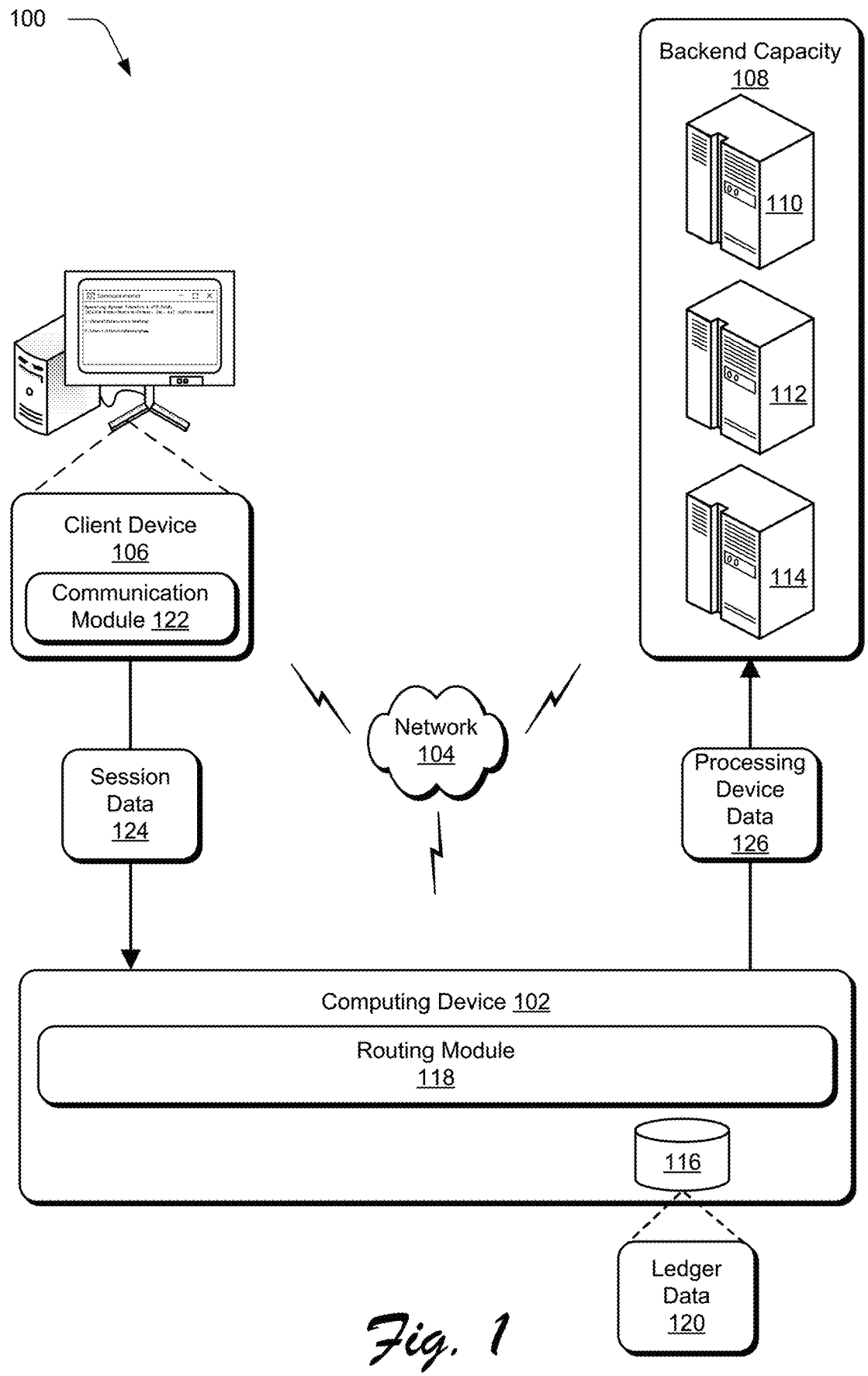
FIG. 1 is an illustration of an environment in an example implementation that is operable to employ digital systems and techniques for session-based routing as described herein.

Conventional dynamic load balancing systems route streams of data or sessions between client device endpoints and backend processing devices available to a server system. Because the backend processing devices of conventional systems communicate and synchronize, a single session may be associated with multiple different backend processing devices. Although this communication between the backend processing devices facilitates use of multiple different processing devices as part of the single session, these communications and synchronizations also increase consumption of network and computational resources.

To overcome the limitations of conventional systems, techniques and systems are described for session-based routing. In one example, a computing device implements a routing system to receive session data of a session that describes a session ID. The session ID is a character sequence that includes non-embedded characters and at least one embedded character at a pre-determined index of the character sequence.

The routing system extracts the at least one embedded character from the per-determined index and determines a previous processing device configuration corresponding to the at least one embedded character from ledger data describing a current processing device configuration and previous processing device configurations. For example, the at least one embedded character describes a configuration version identifier and the previous processing device configuration has a same version as the version identifier. The routing system uses the previous processing device configuration and the non-embedded characters of the session ID to identify a particular processing device of a plurality of processing devices to receive the session data.

In one example, the routing system performs a hashing operation on the non-embedded characters. In this example, the routing system identifies the particular processing device by performing a modulo operation on a result of the hashing operation. The routing system then maps the session data to the particular processing device.

Because the routing system is capable of identifying the particular processing device using the session ID and the ledger data, the particular processing device does not need to communicate and/or synchronize with other processing devices of the plurality of processing devices. This improves conventional load balancing technology that relies on communications and synchronizations between backend processing devices for session-based routing because these additional communications consume additional network resources, create additional device dependencies, increase network latency, etc. Since the described systems are capable of mapping session data between client devices and backend processing devices through use of the session IDs and the ledger data, these systems are usable for routing in any environment including environments in which backend processing devices do not communicate with other backend processing devices.

By using the session ID and the ledger data in this manner, the described systems are capable of avoiding synchronization altogether which significantly improves operation of systems that do not have synchronization capability. For example, systems that are primarily used for failover and disaster scenarios are not yet capable of such synchronization. For these systems, use of the described systems and techniques provides the benefits associated with synchronization functionality without the design and maintenance cost of adding the synchronization functionality. The described systems leverage the session IDs and the ledger data to provide additional functionality as well.

For example, the routing system leverages the session IDs and the ledger data to direct a specific session to a specific processing device of a plurality of available processing devices. This is particularly useful for monitoring a canary release which is a new version of an existing application. In this example, the routing system maps some sessions to a canary processing device which has the new version of the existing application. The routing system maps other sessions to a non-canary processing device which has the existing application. Performance of the canary processing device is compared to performance of the non-canary processing device to validate the new version of the existing application before including this new version in the plurality of available processing devices.

In another example, the routing system leverages the session IDs and/or the ledger data to drain a processing device before decommissioning the processing device. In this example, the routing system uses session durations along with the ledger data to ensure that all sessions mapped to the processing device are complete. Once these sessions have completed, the routing system decommissions the processing device without impacting other sessions mapped to other processing devices. In a similar manner, the routing system drains a processing device configuration by draining all of the processing devices included in the processing device configuration. The routing system then decommissions the processing device configuration and updates the ledger data to remove the decommissioned processing device configuration. Thus, the described systems facilitate scaling of processing device configurations such that capacity is increasable or decreasable in substantially real time without affecting existing sessions.

Term Examples

As used herein, the term "processing device" refers to a defined amount of computing capacity of at least one computing device. By way of example, a processing device is a single physical server or multiple physical servers. In an example, a processing device is a defined amount of computing capacity providable by multiple different computing devices "over the cloud."

As used herein, the term "processing device configuration" refers to a specific set or group of processing devices. By way of example, a processing device configuration includes a single processing device or multiple processing devices.

As used herein, the term "session" refers to a finite duration event during which data is communicated between at least one client device and a processing device via a network.

As used herein, the term "session ID" refers to a character sequence having non-embedded characters and at least one embedded character at a pre-determined index of the character sequence. A length of this character sequence is fixed in one example and this length is variable in another example.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

As shown, the illustrated environment 100 includes a client device 106 and backend capacity 108 which are also connected to the network 104. Although a single client device 106 is shown, it is to be understood that in some examples the client device 106 is representative of multiple client devices 106. The backend capacity 108 is illustrated to include processing devices 110-114 in an example processing device configuration. For example, the backend capacity 108 is available "over the cloud" and the backend capacity 108 is therefore scalable based on capacity demand. In one example, the backend capacity 108 is down scalable to include only processing device 110. This downscaled backend capacity 108 is up scalable to include the processing devices 110-114 and/or additional processing devices.

The computing device 102 includes a storage device 116 and a routing module 118. The storage device 116 is illustrated to include ledger data 120 which describes processing device configurations of the backend capacity 108 such as a current processing device configuration of the backend capacity 108 and previous processing device configurations of the backend capacity 108. The ledger data 120 also describes a version identifier for each of these processing device configurations. In one example, each version identifier is unique and is usable to identify a particular processing device configuration. The computing device 102 implements the routing module 118 to process the ledger data 120 as part of session-based routing in the illustrated example.

As illustrated, the client device 106 includes a communication module 122, and the client device 106 implements the communication module 122 to transmit and/or receive data via the network 104. In one example, the client device 106 implements the communication module 122 to transmit session data 124 to the computing device 102 via the network 104. In some examples, the session data 124 includes session request data describing a request for a session ID and session update data describing the session ID. The session ID is character sequence that includes non-embedded characters and at least one embedded character at a pre-determined index of the character sequence.

The routing module 118 receives that session data 124 and processes the session data 124 and the ledger data 120. In an example in which the session data 124 includes session request data describing a request for a session ID of a session, the routing module 118 generates the session ID as a character sequence including non-embedded characters. In this example, the routing module 118 embeds at least one character at a pre-determined index of the character sequence. For example, the at least one character describes a version identifier of a current processing device configuration of the backend capacity 108. The routing module 118 maps the session request data to the backend capacity 108 based on the version identifier.

This is illustrated by the computing device 102 transmitting processing device data 126 to the backend capacity 108. The processing device data 126 describes one of the processing devices 110-114, and the backend capacity 108 routes the session request data to the processing device described by the processing device data 126. In one example, the routing module 118 determines a particular processing device of the processing devices 110-114 using the non-embedded characters of the session ID and the current processing device configuration. The routing module 118 then generates the processing device data 126 as describing the particular processing device of the processing devices 110-114.

In an example in which the session data 124 includes session update data describing a session ID as a character sequence including non-embedded characters and at least one embedded character at a pre-determined index of the character sequence, the routing module 118 extracts the at least one embedded character from the pre-determined index and identifies a processing device configuration that corresponds to the at least one embedded character from the ledger data 120. In this example, the routing module 118 maps the session update data to the backend capacity 108 based on the processing device configuration. For example, the routing module 118 determines a particular processing device of the processing devices 110-114 by performing a hashing operation on the non-embedded characters of the session ID and performing a modulo operation on a result of the hashing operation. The routing module 118 then generates the processing device data 126 as describing the particular processing device of the processing devices 110-114.

Consider an example of session-based routing in which the backend capacity 108 initially only includes the processing device 110. In this example, the client device 106 implements the communication module 122 to transmit the session data 124 to the computing device 102 via the network 104. The computing device 102 implements the routing module 118 to process the session data 124 which describes a session ID as a character sequence including non-embedded characters and at least one embedded character at a pre-determined index of the character sequence.

The routing module 118 extracts the at least one embedded character from the pre-determined index. The routing module 118 then processes the ledger data 120 and determines a particular configuration of the processing devices 110-114 that corresponds to the at least one embedded character. In on example, the at least one embedded character describes a version identifier of the particular configuration of the processing devices 110-114. Using this particular configuration and the non-embedded characters of the session ID, the routing module 118 identifies the processing device 110 and the routing module 118 generates the processing device data 126 as describing the processing device 110.

The session data 124 is mapped to the processing device 110. After this mapping, the backend capacity 108 is modified to include processing device 112 and processing device 114 but the backend capacity 108 no longer includes the processing device 110. For example, the routing module 118 removes the processing device 110 from the backend capacity 108 to decommission the processing device 110.

The client device 106 transmits another instance of the session data 124 to the computing device 102 and the routing module 118 processes the session data 124 which describes the session ID as the character sequence including the non-embedded characters and the at least one embedded character at the pre-determined index of the character sequence. The routing module 118 extracts the at least one embedded character and processes the ledger data 120 to identify the particular configuration of the processing devices 110-114 based on the at least one embedded character. Using the particular configuration of the processing devices 110-114 and the non-embedded characters of the character sequence, the routing module 118 identifies the processing device 110 for receiving the session data 124.

However, in this example the processing device 110 is no longer included in the backend capacity 108. If the routing module 118 maps the session data 124 to the processing device 112 or the processing device 114, then some portions of the session will be included in the processing device 110 and other portions of the session will be included in the processing device 112 and/or the processing device 114. The routing module 118 routes the session data 124 to the processing device 110 even though the processing device 110 is no longer included in the backend capacity 108 in this example. By routing the session data 124 to the processing device 110 in this way, the routing module 118 ensures that all portions of the session will be included in the processing device 110.

Figure 2:
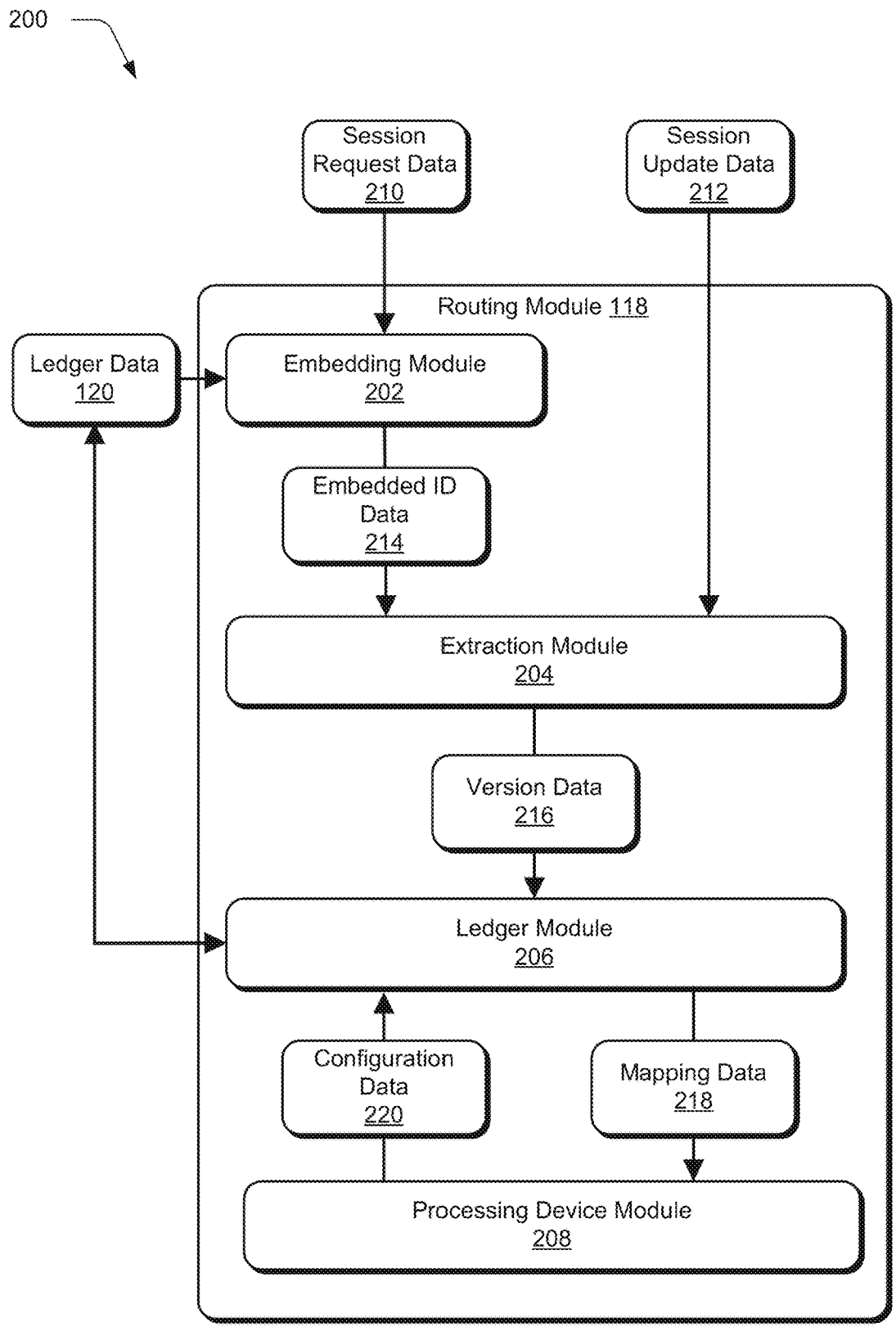
FIG. 2 depicts a system in an example implementation showing operation of a routing module for session-based routing.

FIG. 2 depicts a system 200 in an example implementation showing operation of a routing module 118. The routing module 118 is illustrated to include an embedding module 202, an extraction module 204, a ledger module 206, and a processing device module 208. The routing module 118 receives the session data 124 which is illustrated to include session request data 210 and session update data 212. The session request data 210 describes a request for a session ID of a session. The session update data 212 describes an update to the session and the session ID.

Figure 3A:
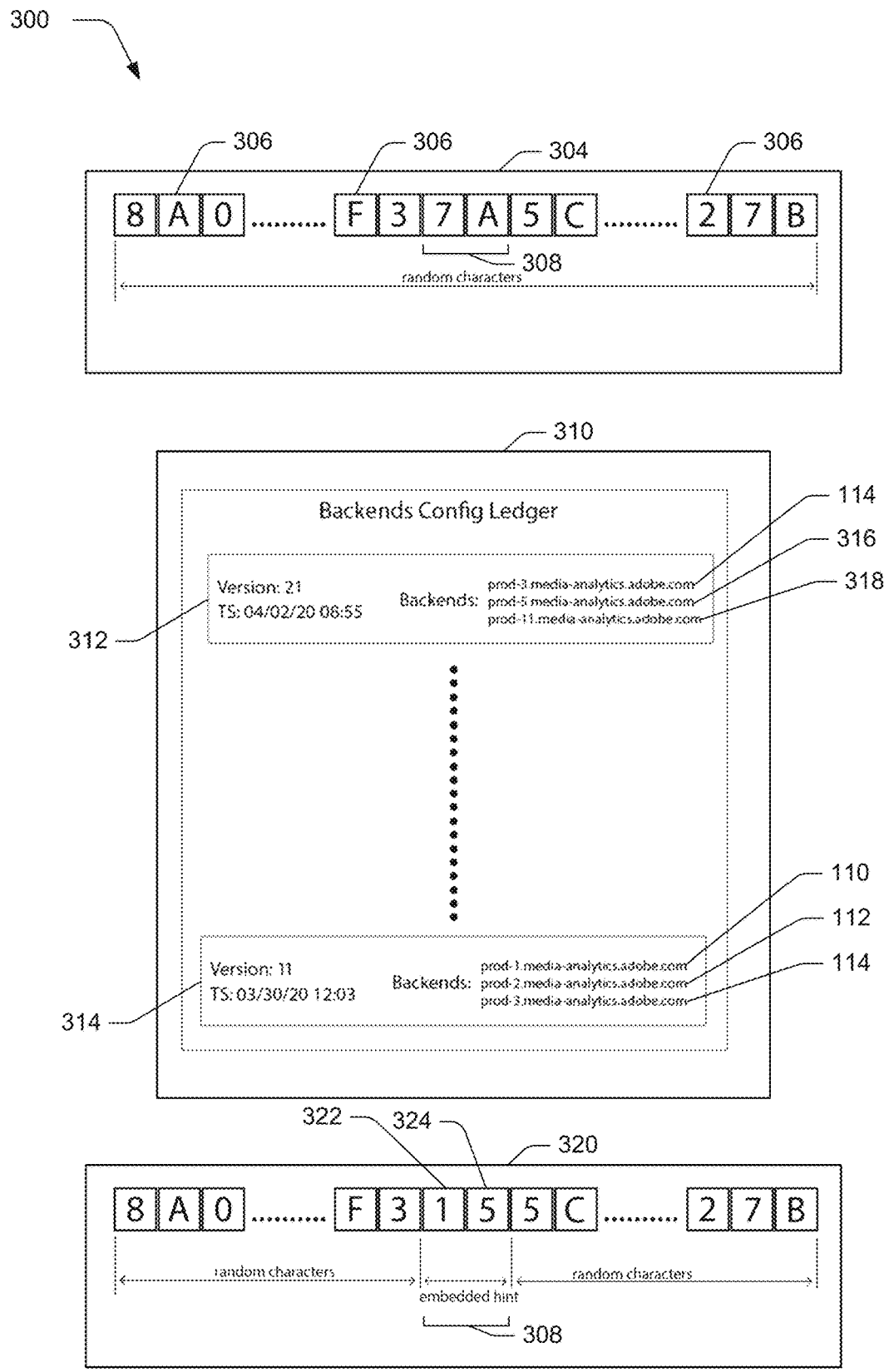
FIGS. 3A and 3B illustrate an example of embedding a version identifier of a current processing device configuration in a session ID and using a version identifier of a processing device configuration embedded in a session ID for session-based routing.
Figure 3B:
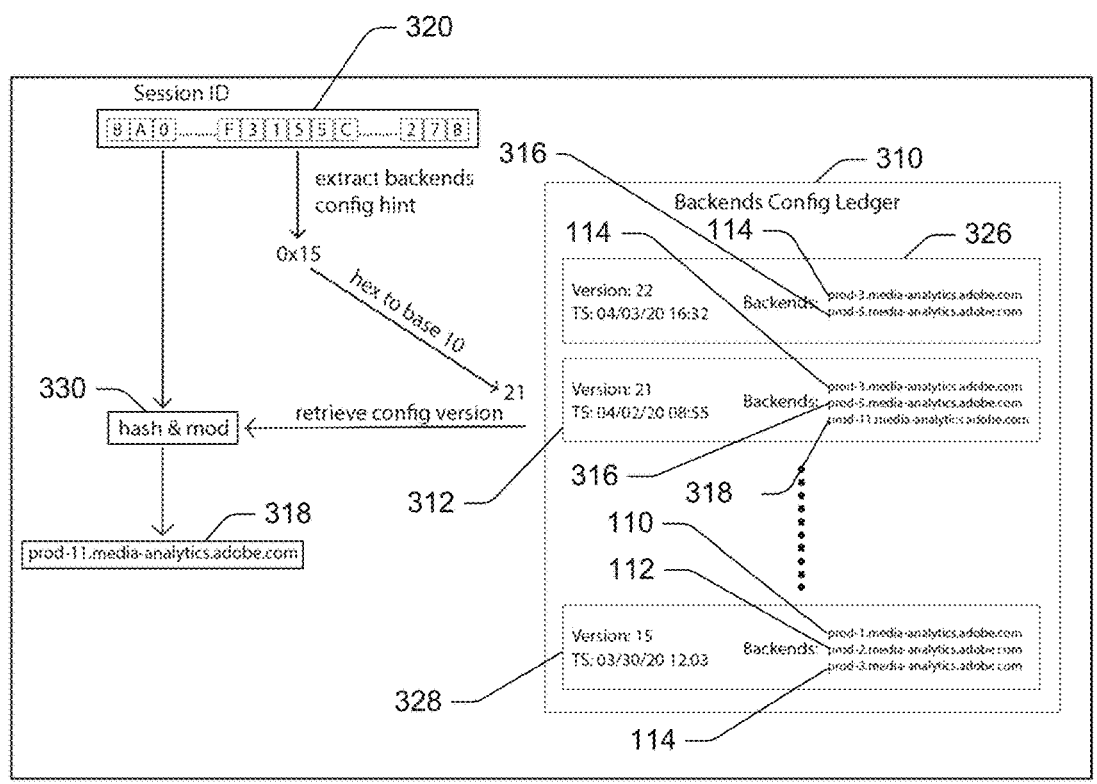

FIGS. 3A and 3B illustrate an example of embedding a version identifier of a current processing device configuration in a session ID and using a version identifier of a processing device configuration embedded in a session ID for session-based routing. FIG. 3A illustrates a representation 300 of embedding a version identifier of a current processing device configuration in a session ID. FIG. 3B illustrates a representation 302 of using a version identifier of a processing device configuration embedded in a session ID.

As shown in FIG. 3A, the embedding module 202 receives the session request data 210 describing the request for the session ID and the embedding module 202 generates a character sequence 304 including non-embedded characters 306 in response to receiving the session request data 210. The character sequence 304 also includes a pre-determined index 308 which includes two characters in the illustrated example. The embedding module 202 also receives the ledger data 120 which is illustrated in FIG. 3A as a ledger 310 that includes a current processing device configuration 312 and a previous processing device configuration 314. The previous processing device configuration 314 has a version identifier "Version 11" and includes the processing devices 110-114. The current processing device configuration 312 has a version identifier "Version 21" and includes the processing device 114 as well as processing devices 316, 318.

The embedding module 202 extracts the version identifier "Version 21" from the ledger 310 and generates a session ID 320 by embedding the version identifier "Version 21" in the character sequence 304 at the pre-determined index 308. As shown, the embedding module 202 embeds characters 322, 324 at the pre-determined index 308 of the session ID 320. To do so, the embedding module 202 converts the number 21 of "Version 21" which is a base ten number to a hexadecimal number which is 15. The embedding module 202 embeds the version identifier in the session ID by assigning values of 1 and 5 to characters 322 and 324, respectively.

By converting the base ten number 21 of the version identifier "Version 21" into the hexadecimal number 15 or any base greater than ten, the embedding module 202 increases a number of unique version identifiers which can be assigned to the two characters 322, 324. For example, each of the two characters 322, 324 describe 10 unique numbers in base ten but each of the two characters 322, 324 describe 16 unique numbers in hexadecimal or base 16. In another example, the embedding module 202 could convert the base ten number 21 of the version identifier "Version 21" to the base 20 number of 11 and assign values of 1 and 1 to characters 322 and 324, respectively. In this example, each of the two characters 322, 324 are usable to describe 20 unique numbers. The embedding module generates embedded ID data 214 as describing the session ID 320.

As illustrated in FIG. 2, the extraction module 204 receives the session update data 212 and/or the embedded ID data 214 and processes the session update data 212 and/or the embedded ID data 214 to generate version data 216. With reference to FIG. 3B, the representation 302 includes the session ID 320 which is described by the session update data 212. As shown, the session ID 320 is a character sequence including non-embedded characters 306 and the two embedded characters 322, 324 at the pre-determined index 308 of the character sequence. The extraction module 204 extracts the hexadecimal number 15 from the embedded characters 322, 324 of the session ID 320 and the extraction module converts to hexadecimal number 15 to the base ten number 21 which corresponds to the version identifier "Version 21." The extraction module 204 generates the version data 216 as describing "Version 21."

The ledger module 206 receives the version data 216 and the ledger data 120 and processes the version data 216 and/or the ledger data 120 to generate mapping data 218. As shown in FIG. 3B, the ledger data 120 describes the ledger 310 which has a new current processing device configuration 326. The processing device configuration 312 is now a previous processing device configuration along with processing device configuration 328. The processing device configuration 328 has a version identifier "Version 15" and includes the processing devices 110-114. The processing device configuration 312 has the version identifier "Version 21" and includes the processing devices 114, 316, 318. The current processing device configuration 326 has a version identifier "Version 22" and includes processing devices 114, 316.

The ledger module 206 processes the ledger data 120 and compares the version identifier "Version 21" described by the version data 216 to the version identifiers of the processing device configurations 326, 312, 328. For example, the version identifier "Version 22" of the current processing device configuration 326 does not match the version identifier "Version 21" described by the version data 216. In a similar example, the version identifier "Version 15" of the processing device configuration 328 does not match version identifier "Version 21." However, the version identifier "Version 21" of the processing device configuration 312 does match the version identifier "Version 21" described by the version data 216.

The ledger module 206 uses the processing device configuration 312 which includes the processing devices 114, 316, 318 as well as a defined hashing function to generate the mapping data 218. For example, the ledger 310 and the processing device configuration 312 indicate a hashing key and a hashing algorithm which are usable to generate the mapping data 218. In another example, the session update ID 320 indicates the hashing key and the hashing algorithm usable to generate the mapping data 218.

The ledger module 206 performs a hashing operation using the non-embedded characters 306 according to the hashing algorithm. In one example, the ledger module 206 communicates a request for the hashing operation to the routing module 118 and the routing module 118 performs the hashing operation using the non-embedded characters 306. The ledger module 206 performs a modulo operation on a result of the hashing operation. For example, the ledger module 206 communicates a request for the modulo operation to the routing module 118 and the routing module 118 performs the modulo operation on the result of the hashing operation. This hashing operation and subsequent modulo operation are illustrated as a hashing and modulo operation 330. As shown in FIG. 3B, the ledger module 206 identifies the processing device 318 for receiving the session update data 212 based on the hashing and modulo operation 330. The ledger module 206 generates the mapping data 218 as describing the processing device 318.

The processing device module 208 receives the mapping data 218 and processes the mapping data 218 to map the session update data 212 to the processing device 318. For example, the processing device module 208 controls the backend capacity 108 and the processing device module 208 routes the session update data 212 to the processing device 318. The processing device module 208 also generates configuration data 220 which describes the current processing device configuration 326 and previous processing device configurations 312, 328.

By comparing the ledger 310 as depicted in FIG. 3A with the ledger 310 as depicted in FIG. 3B, it is observable that the ledger 310 illustrated in FIG. 3B is an updated version of the ledger 310 illustrated in FIG. 3A. In the illustrated example, the ledger module 206 received the configuration data 220 describing the processing device configurations 326, 312, 328 and the ledger module 206 updated the ledger data 120 to include the new processing device configuration 326. As shown, the ledger 310 depicted in FIG. 3B reflects this updated ledger data 120.

Accordingly, the ledger module 206 receives the configuration data 220 and process the configuration data 220 to update the ledger data 120 with any changes to the processing device configurations 326, 312, 328 which includes additional processing device configurations in one example. The ledger module 206 also updates the ledger data 120 by removing processing device configurations from the ledger 310. For example, the ledger module 206 removes processing device configurations from the ledger which are older than a maximum processing device configuration age. An example of this is described in greater detail with respect to FIG. 7.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which session update data is received describing a session ID and the session update data is mapped to a particular processing device based on the session ID.

Session update data is received describing a session ID for a session as a character sequence including non-embedded characters and at least one embedded character at a pre-determined index of the character sequence (block 402). The computing device 102 implements the routing module 118 to receive the session update data in one example. The at least one embedded character is extracted from the pre-determined index (block 404). For example, the routing module 118 extracts the at least one embedded character from the pre-determined index.

A previous processing device configuration corresponding to the at least one embedded character is determined from ledger data describing a current processing device configuration and previous processing device configurations (block 406). In one example, the computing device 102 implements the routing module 118 to determine the previous processing device configuration from the ledger data. The session update data is mapped to a particular processing device based on the previous processing device configuration and the non-embedded characters of the character sequence (block 408). The routing module 118 maps the session update data to the particular processing device in an example.

Figure 5:
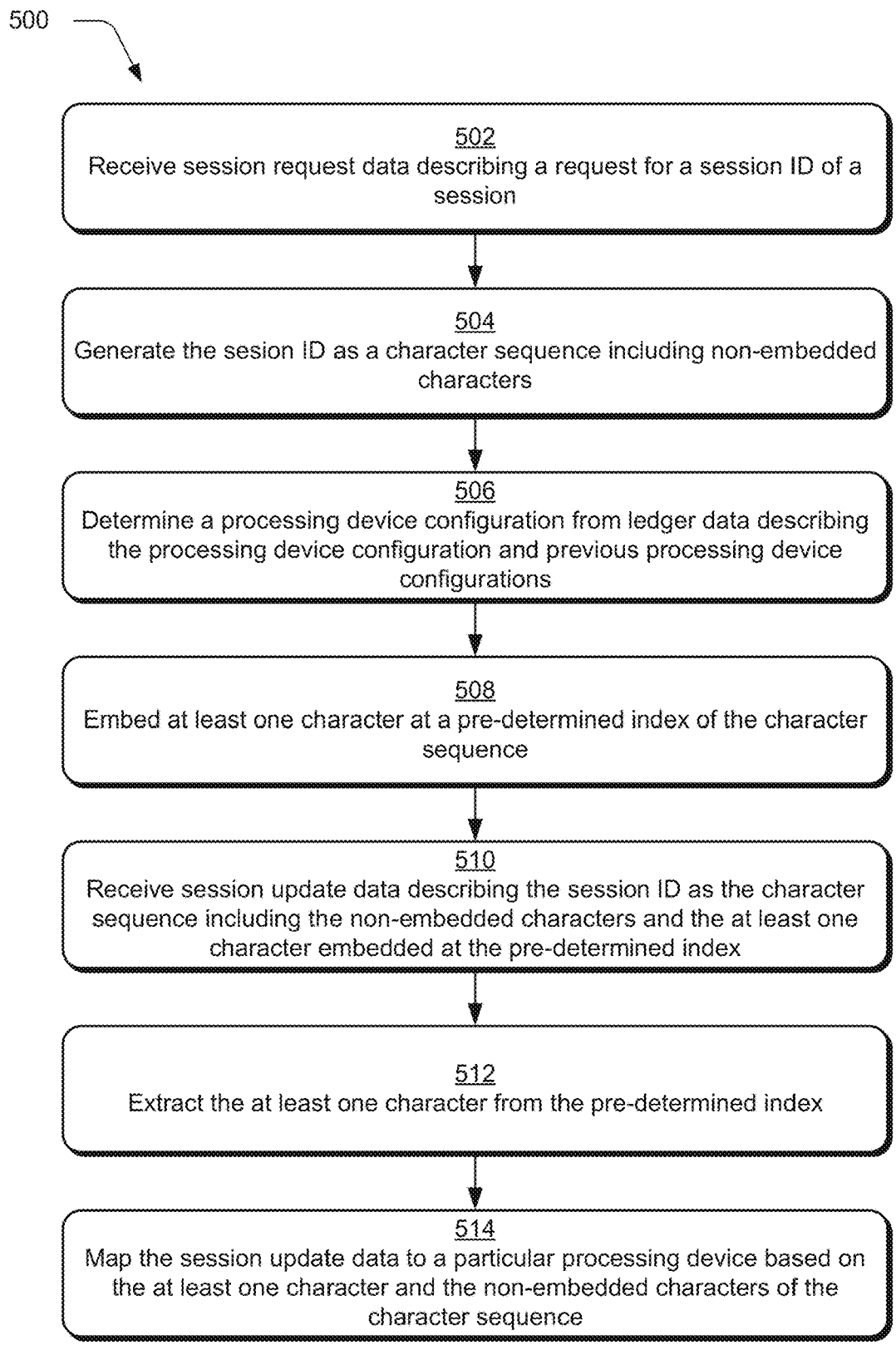
FIG. 5 is a flow diagram depicting a procedure in an example implementation in which session request data is received describing a request for a session ID of a session and session update data is mapped to a particular processing device based on the session ID.

FIG. 5 is a flow diagram depicting a procedure 500 in an example implementation in which session request data is received describing a request for a session ID of a session and session update data is mapped to a particular processing device based on the session ID. Session request data is received describing a request for a session ID of a session (block 502). For example, the routing module 118 receives the session request data. The session ID is generated (block 504) as a character sequence including non-embedded characters. The computing device 102 implements the routing module 118 to generate the session ID in one example.

A processing device configuration is determined from ledger data describing the processing device configuration and previous processing device configurations (block 506). In an example, the routing module 118 determines the processing device configuration from the ledger data. At least one character is embedded at a pre-determined index of the character sequence (block 508). For example, the routing module 118 embeds the at least one character at the pre-determined index of the character sequence.

Session update data is received describing the session ID as the character sequence including the non-embedded characters and the at least one character embedded at the pre-determined index (block 510). In one example, the computing device 102 implements the routing module 118 to receive the session update data. The at least one character is extracted from the pre-determined index (block 512). For example, the routing module 118 extracts the at least one character from the pre-determined index. The session update data is mapped to a particular processing device based on the at least one character and the non-embedded characters of the character sequence (block 514). The routing module 118 maps the session update data to the particular processing device in an example.

Figure 6:
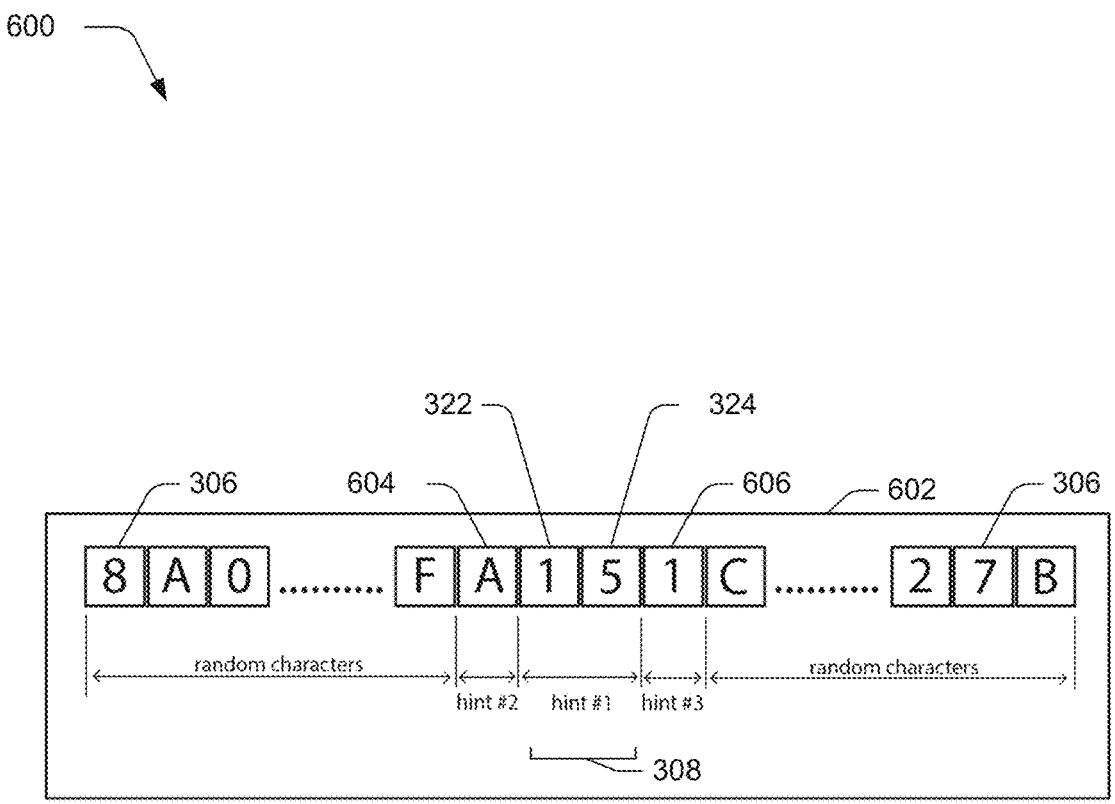
FIG. 6 illustrates an example representation of multiple pre-determined indices of a character sequence of a session ID.

FIG. 6 illustrates an example representation 600 of multiple pre-determined indices of a character sequence of a session ID. The representation 600 includes a session ID 602 as a character sequence including the non-embedded characters 306 and the embedded characters 322, 324 at the pre-determined index 308 of the character sequence. As shown, embedded characters 322, 324 have values of the hexadecimal number "15" which is equivalent to a base ten version identifier "Version 21." The version identifier "Version 21" corresponds to a current processing device configuration at a time when a session associated with the session ID 602 was requested and/or initiated.

In some examples, the session ID 602 includes additional pre-determined indices 604, 606 of the character sequence. For example, additional pre-determined index 604 is usable to encode a format version that supports a variety of additional functionality. As shown, the additional pre-determined index 604 includes the hexadecimal number "A" which encodes the base ten number "10" and corresponds to "Format Version 10."

In one example, this format version indicates which of the characters of the character sequence are at the pre-determined index 308. In this example, "Format Version 10" indicates that characters 322, 324 are at the pre-determined index 308. In another example, "Format Version 10" indicates that the additional pre-determined index 606 is included in the pre-determined index 308. In an additional example, "Format Version 10" indicates that the additional pre-determined index 606 is the pre-determined index 308.

Consider an example in which the additional pre-determined index 604 is used to embed a format version of the session ID 602 within character sequence. In this example, the embedded format version indicates a number of pre-determined indices included in the session ID 602, a length of each pre-determined index included in the session ID 602, obfuscation data, encryption data, a duration of a session associated with the session ID 602, a type of session associated with the session ID 602 such as whether the session is a digital audio session, a digital video session, a digital content creation session, an augmented reality session, a virtual reality session, and so forth. For example, "Format Version 10" indicates that the pre-determined index 308 begins at character 322 and ends at character 324. In another example, "Format Version 10" indicates that the additional pre-determined index 606 includes obfuscation data. In this example, the obfuscation data describes a mask such as an XOR mask usable to deobfuscate data included in the characters 322, 324 at the pre-determined index 308 of the character sequence.

In the illustrated example, the additional predetermined index 606 includes a character having a hexadecimal number "1" which encodes the base ten number "1" and corresponds to "Algorithm Version 1." For example, "Algorithm Version 1" indicates a particular hashing function to apply to the non-embedded characters 306 to identify a particular processing device of a particular processing device configuration version indicated by the embedded characters 322, 324 at the pre-determined index 308 of the character sequence. In one example, "Algorithm Version 1" indicates a particular hashing key usable to identify the particular processing device. In another example, "Algorithm Version 1" indicates a location of obfuscation/deobfuscation data and/or a location of encryption/decryption data.

In some examples, the additional pre-determined indices 604, 606 are reserved for implementation of additional functionality which is being developed or will be developed. In these examples, the additional pre-determined indices 604, 606 facilitate evolution of functionality included as part of the session ID 602. For example, the additional pre-determined indices 604, 606 support additional functionality as part of session-based routing and/or additional functionality for use in other applications such as other applications which leverage self-describing IDs.

Consider an example in which the pre-determined index 308 is determined dynamically such as based on a length of the session ID 602. For example, the pre-determined index 308 is not at a fixed position. In this example, the routing module 118 identifies the pre-determined index 308 using any suitable method such as extracting metadata from the session ID 602 describing the pre-determined index 308. For example, the routing module 118 identifies the pre-determined index 308 based on a character of the session ID 602 having a unique feature regardless of where this character is disposed within the session ID 602.

Figure 7:
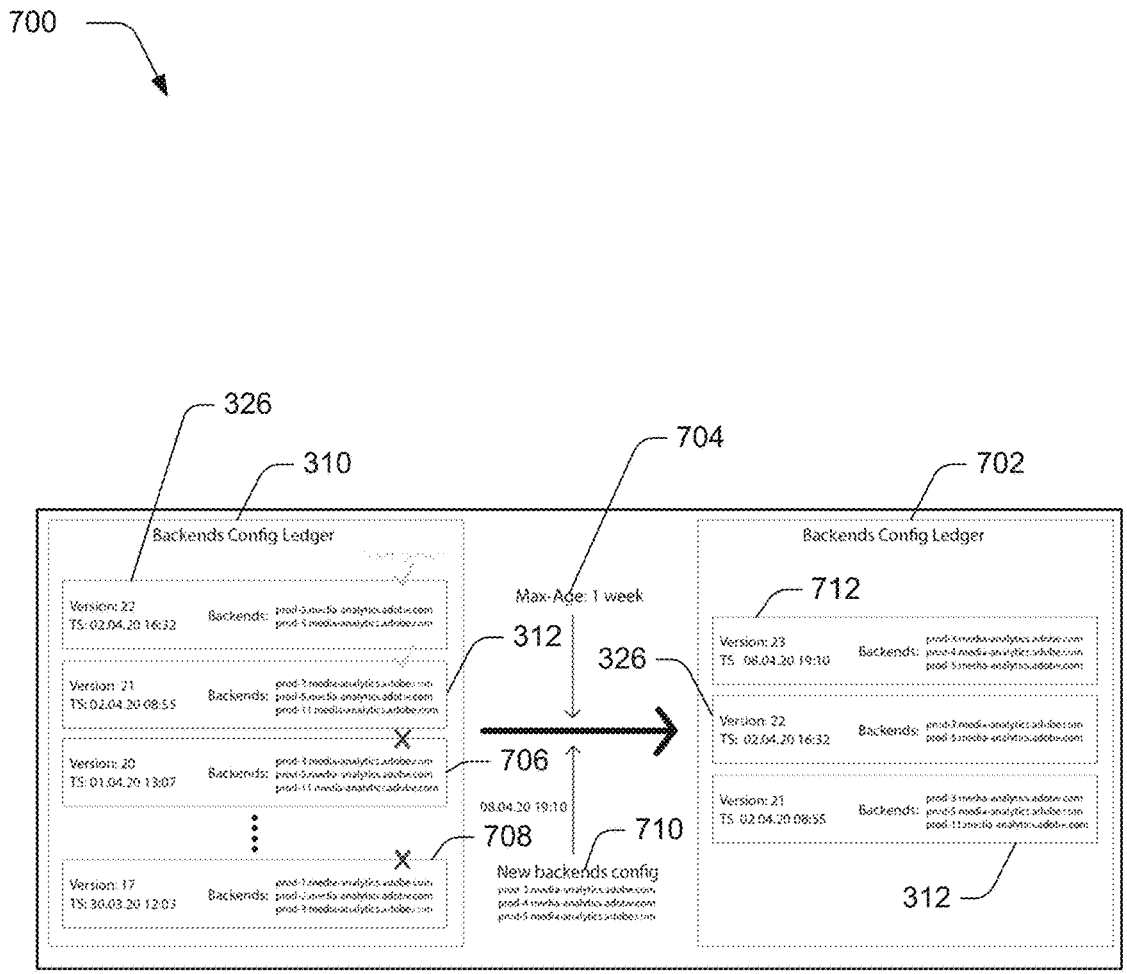
FIG. 7 illustrates an example representation of updating ledger data by removing previous processing device configurations from the ledger data based on a maximum processing device configuration age.

FIG. 7 illustrates an example representation 700 of updating ledger data by removing previous processing device configurations from the ledger data based on a maximum processing device configuration age. As shown, the representation 710 includes the ledger 310 and an updated ledger 702. For example, the routing module 118 generates the updated ledger 702 by updating the ledger data 120 based on a maximum processing device configuration age 704. In this example, the maximum processing device configuration age 704 is illustrated as one week. Consider an example in which the routing module 118 determines the maximum device processing configuration age 704 based on a duration of a session associated with processing devices included in a processing device configuration. If multiple sessions are mapped to processing devices of the processing device configuration, then the routing module 118 determines the maximum processing device configuration age 704 based on a session having a longest duration of the sessions included in the multiple sessions.

The ledger 310 includes the current processing device configuration 326, the processing device configuration 312, a previous processing device configuration 706, and an additional previous processing device configuration 708. In one example, the routing module 118 determines the maximum processing device configuration age 704 based on a longest duration session of multiple sessions associated with processing devices of the current processing device configuration 326, the processing device configuration 312, the previous processing device configuration 706, and the additional previous processing device configuration 708. Consider an example in which a duration of the longest duration session associated with the processing devices of the processing device configurations 312, 326, 706, 708 is 24 hours.

In this example, routing module 118 determines the maximum processing device configuration age 704 to be one week which ensures that the 24-hour duration session will be completed during the maximum processing device configuration age 704. For example, the maximum processing device configuration age 704 has a temporal margin of six days or 144 hours of time which exceeds the duration of the 24-hour duration session. In another example in which the duration of the longest duration session associated with the processing devices of the processing device configurations 312, 326, 706, 708 is 24 hours, the routing module 118 determines the maximum processing device configuration age 704 to be 36 hours.

Regardless of a manner in which the routing module 118 determines the maximum processing device configuration age 704, the routing module 118 compares the maximum processing device configuration age 704 to ages of the processing device configurations 312, 326, 706, 708. In the illustrated example, the routing module 118 determines that an age of the previous processing device configuration 706 is greater than the maximum processing device configuration age 704 and an age of the additional previous processing device configuration 708 is greater than the maximum processing device configuration age 704. As shown, the routing module 118 also determines that an age of the current processing device configuration 326 is less than the maximum processing device configuration age 704 and an age of the processing device configuration 312 is less than the maximum processing device configuration age 704.

Based on these determinations, the routing module 118 updates the ledger data 120 by removing the previous processing device configuration 706 and the additional previous processing device configuration 708 from the ledger data 120. In an example in which the age of the current processing device configuration 326 is greater than the maximum device configuration age 704, the routing module 118 does not remove the current processing device configuration 326 from the ledger data 120. This is because the routing module 118 maps new sessions to processing devices included in the current processing device configuration 326.

For example, the routing module 118 generates the updated ledger 702 based on the updated ledger data 120. In some examples, the routing module 118 performs such updates periodically or in response to a particular event such as receiving a new current processing device indication 710. In one example, the configuration data 220 describes the new current processing device indication 710 and the routing module 118 processes the configuration data 220 to generate the updated ledger 702 which includes a new current device configuration 712. In response to receiving the new current processing device indication 710, the routing module 118 updates the ledger data 120 to include the new current device configuration 712 and also updates the ledger data 120 to include the previous current processing device configuration 326 among the previous processing device configurations such as the processing device configuration 312.

Accordingly, the updated ledger 702 includes the current processing device configuration 712 and the processing device configurations 326, 312. By removing processing device configurations from the ledger data 120 which have ages greater than the maximum processing device configuration age 704 in this way, the routing module 118 reduces an amount of data processed in identifying a processing device configuration having a processing device which is associated with a particular session. For example, by updating the ledger data 120 in response to changes in processing device configurations such as a change to a current processing device configuration, the routing module 118 avoids maintaining a durable timer for updates to the ledger data 120. In another example, the routing module 118 maintains the durable time for updates to the ledger data 120.

Consider an example in which the updated ledger 702 includes multiple different ledgers. In this example, rather referencing a single updated ledger 702, the routing module 118 reference multiple different ledgers. By referencing multiple different ledgers in this way, the updated ledger 702 does not need to be updated in response to each change to the current processing device configuration. For example, each of the multiple different ledgers is updated only for changes to the current processing device configuration that are relevant to each of the multiple different ledgers.

Figure 8:
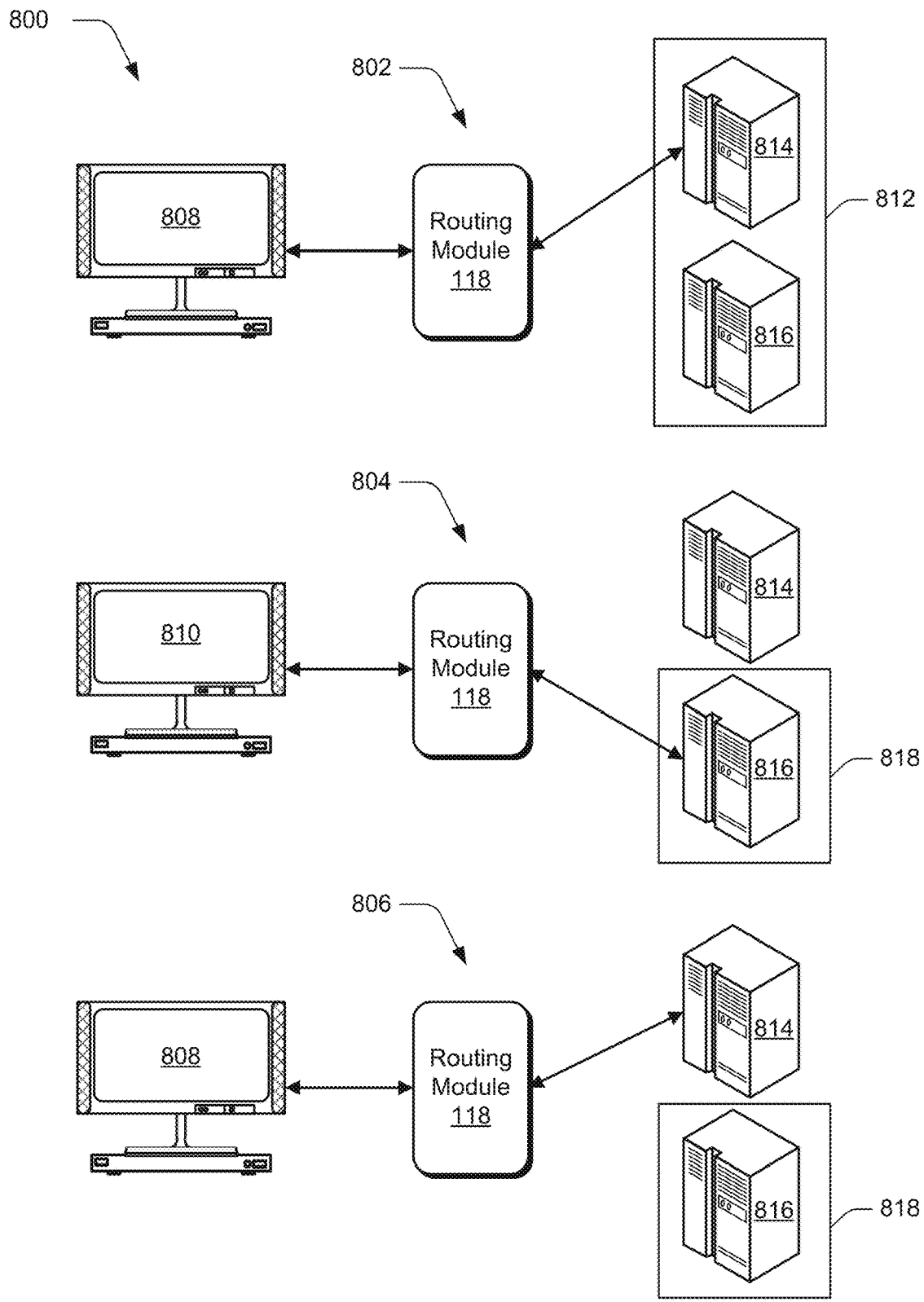
FIG. 8 illustrates an example representation of session-based routing with different processing device configurations.

FIG. 8 illustrates an example representation 800 of session-based routing with different processing device configurations. The representation 800 is illustrated to include examples 802-806 as well as a first client device 808 and a second client device 810. In example 802, the first client device 808 transmits session data 124 to the computing device 102, and the computing device 102 implements the routing module 118 to receive the session data 124. As shown, example 802 has a first processing device configuration 812 which includes processing device 814 and processing device 816. The routing module 118 maps the session data 124 to the processing device 814 as illustrated in the example 802.

In example 804, the processing device configuration 812 is modified as processing device configuration 818. The processing device configuration 818 includes the processing device 816 but no longer includes the processing device 814. The second client device 810 transmits session data 124 to the computing device 102 and the routing module 118 maps the session data 124 to the processing device 816.

In example 806, the first client device 808 transmits additional session data 124 to the computing device 102 but the processing device configuration 818 does not include the processing device 814 which is associated with a session described in part by the session data 124. In this example, the routing module 118 maps the additional session data 124 to the processing device 814 even though the processing device 814 is no longer included in the processing device configuration 818. By mapping the additional session data 124 in this way, the routing module 118 ensures that all portions of the session are included in the processing device 814.

Consider an example in which the routing module 118 encodes a version identifier of the processing device configuration 812 in embedded characters at the pre-determined index 308 of a session ID described by the session data 124 in the example 802. In this example, the routing module 118 extracts the version identifier from the session ID in the example 806 and identifies the processing device configuration 812 from the ledger data 120. The routing module 118 then identifies the processing device 814 based on the processing device configuration 812 and maps the additional session data 124 to the processing device 814 even though the processing device 814 is no longer included in the processing device configuration 818.

Example System and Device

Figure 9:
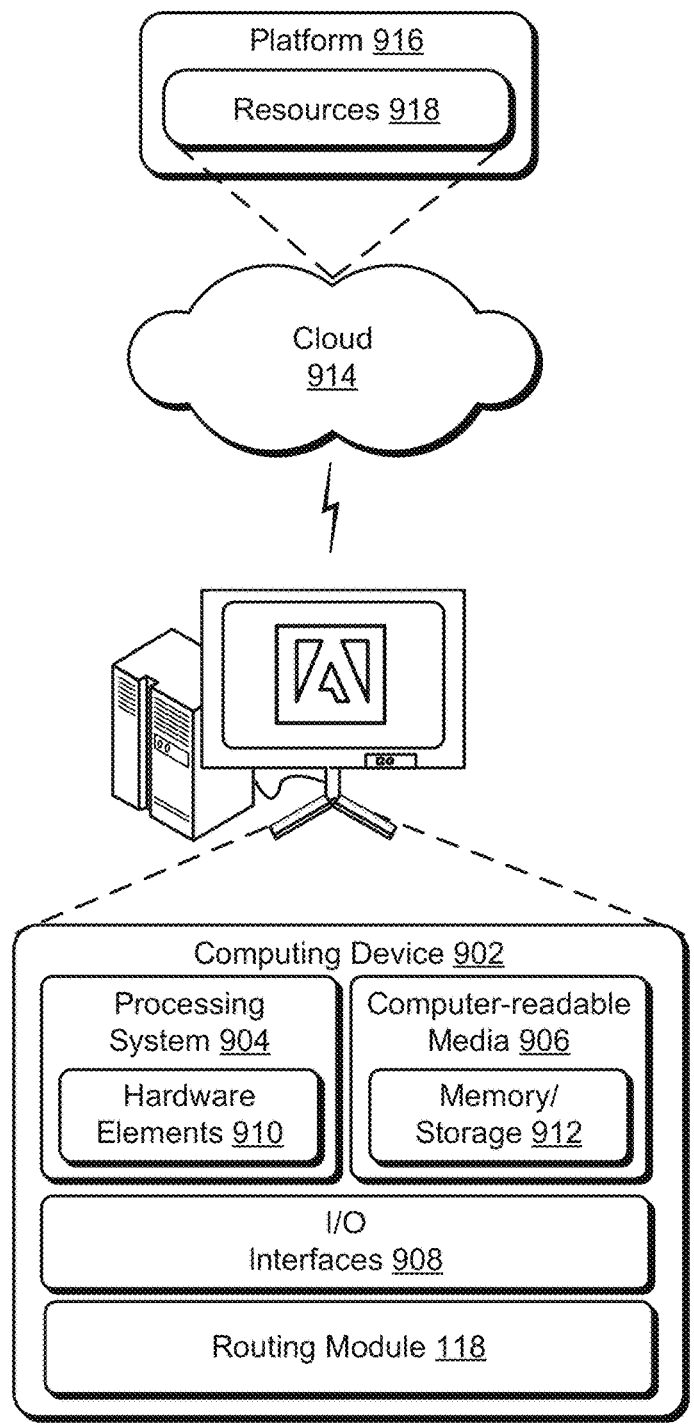
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the routing module 118. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are be configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage component 912 includes volatile media (such as random access memory (RAM)) and/or nonvolatile media (such as read only memory (ROM), Flash memory, optical disks, magnetic disks, and so forth). In another example, the memory/storage component 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for session-based routing have been described in language specific to structural features and/or methods, it is to be understood that the appended claims are not necessarily limited to the specific features or methods described. Rather, the specific features and methods are disclosed as example implementations of systems for session-based routing, and other equivalent features and methods are intended to be within the scope of the appended claims. Further, various different examples are described and it is to be appreciated that each described example is implementable independently or in connection with one or more other described examples.

What is claimed is:

1. In a digital medium session data routing environment, a method implemented by a computing device, the method comprising:
   receiving, by the computing device via a network, session update data describing a session ID for a session as a character sequence including non-embedded characters and at least one embedded character at a pre-determined index of the character sequence;
   extracting, by the computing device, the at least one embedded character from the pre-determined index;
   determining, by the computing device, a previous processing device configuration corresponding to the at least one embedded character from ledger data describing a current processing device configuration and previous processing device configurations; and
   mapping, by the computing device via the network, the session update data to a particular processing device based on the previous processing device configuration and the non-embedded characters of the character sequence.

2. The method as described in claim 1, wherein the particular processing device is included in the current processing device configuration.

3. The method as described in claim 1, wherein the particular processing device is not included in the current processing device configuration.

4. The method as described in claim 1, further comprising:
   identifying the particular processing device by performing a hashing operation using the non-embedded characters of the character sequence; and
   performing a modulo operation on a result of the hashing operation.

5. The method as described in claim 1, wherein the at least one embedded character includes at least two embedded characters.

6. The method as described in claim 1, further comprising:
   determining that the session is complete based on a duration of the session; and
   decommissioning the particular processing device based on determining that the session is complete.

7. The method as described in claim 6, further comprising:
   determining a maximum processing device configuration age based on the duration of the session; and
   updating the ledger data by removing at least some of the previous processing device configurations from the ledger data based on the maximum processing device configuration age.

8. The method as described in claim 1, further comprising deobfuscating the at least one embedded character.

9. The method as described in claim 1, further comprising decrypting the at least one embedded character.

10. The method as described in claim 1, wherein the at least one embedded character describes at least one of a version identifier of the previous processing device configuration, a hashing algorithm version identifier, or an encryption algorithm version identifier.

11. In a digital medium session data routing environment, a system comprising:
   an embedding module implemented at least partially in hardware of a computing device to:
      receive session request data describing a request for a session ID of a session via a network;
      generate the session ID for the session as a character sequence including non-embedded characters;
      determine a processing device configuration from ledger data describing the processing device configuration and previous processing device configurations; and
      embed at least one character at a pre-determined index of the character sequence;
   an extraction module implemented at least partially in the hardware of the computing device to:
      receive session update data describing the session ID as the character sequence including the non-embedded characters and the at least one character embedded at the pre-determined index; and extract the at least one character from the pre-determined index; and a ledger module implemented at least partially in the hardware of the computing device to map the session update data to a particular processing device via the network based on the at least one character and the non-embedded characters of the character sequence.

12. The system as described in claim 11, wherein the particular processing device is included in a current processing device configuration described by the ledger data.

13. The system as described in claim 11, wherein the particular processing device is not included in a current processing device configuration described by the ledger data.

14. The system as described in claim 11, wherein the ledger module is further implemented to:
determine a maximum processing device configuration age based on a duration of the session; and
update the ledger data by removing at least some of the previous processing device configurations from the ledger data based on the maximum processing device configuration age.

15. The system as described in claim 11, wherein the embedding module is further implemented to obfuscate or encrypt the at least one character embedded at the pre-determined index.

16. The system as described in claim 11, further comprising a processing device module implemented at least partially in the hardware of the computing device to:
determine that the session is complete based on a duration of the session; and
decommission the particular processing device based on determining that the session is complete.

17. One or more computer-readable storage media comprising instructions stored thereon that, responsive to execution by a computing device, causes the computing device to perform operations including:
receiving session update data via a network describing a session update ID for a session as a character sequence including non-embedded characters and at least one embedded character at a pre-determined index of the character sequence;
extracting the at least one embedded character from the pre-determined index;
determining a processing device configuration from ledger data describing the at least one embedded character as corresponding to the processing device configuration;
identifying a particular processing device based on the processing device configuration and the non-embedded character of the character sequence; and
mapping the session update data to the particular processing device via the network.

18. The one or more computer-readable storage media as described in claim 16, wherein at least one embedded character includes at least two embedded characters.

19. The one or more computer-readable storage media as described in claim 18, wherein the at least two embedded characters describe at least one of a version identifier of the processing device configuration, a hashing algorithm version identifier, or an encryption algorithm version identifier.

20. The one or more computer-readable storage media as described in claim 16, the operations further including deobfuscating or decrypting the at least one embedded character.

* * * * *